United States Patent
Reh et al.

(10) Patent No.: US 8,998,313 B2
(45) Date of Patent: Apr. 7, 2015

(54) PASSENGER SEAT WITH A LUGGAGE RECEIVING DEVICE

(71) Applicant: Airbus Operations GmbH, Hamburg (DE)

(72) Inventors: Jan Reh, Hamburg (DE); Andrew Muin, Hamburg (DE); Martin Dehn, Hamburg (DE); Peter Sander, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 200 days.

(21) Appl. No.: 13/721,694

(22) Filed: Dec. 20, 2012

(65) Prior Publication Data

US 2013/0175831 A1      Jul. 11, 2013

Related U.S. Application Data

(60) Provisional application No. 61/579,248, filed on Dec. 22, 2011.

(30) Foreign Application Priority Data

Dec. 22, 2011 (DE) .......................... 10 2011 122 061

(51) Int. Cl.
  *B60N 2/44*    (2006.01)
  *B64D 11/06*   (2006.01)
  *A47B 83/02*   (2006.01)
  *B60N 2/30*    (2006.01)

(52) U.S. Cl.
  CPC *B64D 11/06* (2013.01); *B60N 2/44* (2013.01); *A47B 83/02* (2013.01); *B60N 2/3045* (2013.01); *B60N 2205/30* (2013.01); *B64D 11/0636* (2013.01)

(58) Field of Classification Search
  CPC .... B60N 2205/30; B60N 2/3045; B60N 2/44; B64D 11/06; B64D 2011/0662
  USPC ............ 297/188.1, 188.02, 188.11, 335, 233, 297/234
  See application file for complete search history.

(56) References Cited

U.S. PATENT DOCUMENTS 3,632,161 A * 1/1972 Arfaras et al. ................. 297/145
5,829,836 A * 11/1998 Schumacher et al. ........ 297/257

(Continued)

FOREIGN PATENT DOCUMENTS

DE   10 2006 049 002    7/2007
DE   10 2009 060 415    6/2011

(Continued)

*Primary Examiner* — David R Dunn
*Assistant Examiner* — Jody Giacoman
(74) *Attorney, Agent, or Firm* — Dickinson Wright PLLC (57) ABSTRACT

A passenger seat has a backrest and a seat which has first and second sections each having a first surface for a seat area and a second opposite surface. The second section pivots relative to the first section between a first position, in which the first surfaces of the first and second sections form a usable total seat area, and a second operational position, in which the second section is folded relative to the first section in the direction towards the backrest. Attached to the second seat section is a holder movable relative to the second surface of the second seat section between a first position, in which the holder extends substantially parallel to the second surface of the second seat section, and a second position, in which the holder extends at from 60° to 120° relative to the second surface of the second seat section.

15 Claims, 6 Drawing Sheets

(56) References Cited

U.S. PATENT DOCUMENTS

| | | | |
|---|---|---|---|
| 6,386,629 B1 * | 5/2002 | Severinski et al. | 297/188.1 |
| 7,500,716 B2 * | 3/2009 | Guerin et al. | 297/146 |
| 7,901,005 B2 * | 3/2011 | Khan et al. | 297/331 |
| 8,091,957 B2 * | 1/2012 | Allmann | 297/129 |
| 2002/0175554 A1 | 11/2002 | Cheng | |
| 2005/0062324 A1 * | 3/2005 | Shimasaki et al. | 297/312 |
| 2007/0152480 A1 | 7/2007 | Muin | |
| 2009/0045665 A1 * | 2/2009 | Dowty et al. | 297/423.3 |

FOREIGN PATENT DOCUMENTS

| | | |
|---|---|---|
| DE | 10 2010 046 853 | 3/2012 |
| WO | 03/039908 | 5/2003 |

\* cited by examiner

PASSENGER SEAT WITH A LUGGAGE RECEIVING DEVICE

CROSS REFERENCE TO RELATED APPLICATION

This application is entitled to and claims the benefit of German Application No. DE 10 2011 122 061.9 and U.S. Provisional Application No. 61/579,248, both filed Dec. 22, 2011, the disclosures of which, including the specification, drawings and abstract, are incorporated herein by reference in its entirety.

FIELD

The invention relates to a passenger seat which is suitable for use in the passenger cabin of an aircraft but also for use in other means of transport, such as, for example, buses or trains.

BACKGROUND

In modern means of transport, in particular in aircraft, it is very important from an economic point of view to make optimum use of the available space in a passenger cabin. Passenger cabins are therefore fitted with as many rows of passenger seats as possible, which in Economy Class in particular are positioned with as little space between them as possible. In order to increase the comfort of passengers seated in rows of passenger seats that are close behind one another, DE 10 2010 046 853, which is not prior-published, proposes dividing a seat area of a passenger seat into a first and a second sub-section. The first and second sub-sections of the seat area are movable relative to one another in order to adjust the seat between a first and a second operational position. In the first operational position of the seat, the first sub-section and the second sub-section are positioned behind one another so that the surfaces of the first and second sub-sections form a usable total seat area. In the second operational position of the seat, on the other hand, the first and second sub-sections are positioned above one another in such a manner that a surface of the first sub-section or a surface of the second sub-section forms a usable seat sub-area.

SUMMARY

The object underlying the invention is to provide a passenger seat which allows pieces of luggage to be accommodated in a space-saving manner and thus permits optimum use of the space in a passenger cabin of an aircraft or other means of transport.

The object is achieved by a passenger seat having the features of the attached claims.

The passenger seat according to the invention comprises a backrest and a seat. The backrest is preferably pivotable relative to the seat between an upright position and a reclined position. The seat of the passenger seat system comprises a first section which has a first surface and a second surface opposite the first surface. The seat further comprises a second section, which likewise has a first surface and a second surface opposite the first surface. The first seat section may be adjacent to the backrest of the seat, for example. The first seat section and the second seat section are movable relative to one another. In particular, the second seat section is pivotable relative to the first seat section between a first operational position, in which the first surfaces of the first and second seat sections form a usable total seat area, and a second operational position, in which the second seat section is folded relative to the first seat section in the direction towards the backrest.

When the second seat section is in its first operational position, the first and second seat sections are preferably positioned behind one another relative to the backrest in such a manner that the first surface of the first seat section and the first surface of the second seat section form a usable total seat area. For example, the second seat section may be adjacent to the first seat section and separated from the backrest by the first seat section. The first surface of the first seat section and the first surface of the second seat section are preferably arranged substantially parallel to one another and in a plane. It will be appreciated that a slight parallel offset and/or a slight angular offset of the first surface of the first seat section and of the first surface of the second seat section relative to one another is/are possible, which offset(s) may be intentional for reasons of tolerance or, for example, for ergonomic reasons.

When the second seat section is in its second operational position, on the other hand, the seat has an area that is reduced as compared with the total seat area. When the passenger seat according to the invention is integrated into rows of seats that are arranged one behind the other, as are to be found, for example, in the passenger cabin of an aircraft, the adjustment of the second seat section out of its first operational position and into its second operational position causes the free space between the passenger seat and a row of seats arranged in front of the passenger seat to be increased. That is, of course, also the case when the passenger seat according to the invention is positioned behind a monument, for example a partition wall or the like. Preferably, the size of the first surface of the first seat section corresponds approximately to the size of the first surface of the second seat section. Similarly, the size of the second surface of the first seat section preferably corresponds approximately to the size of the second surface of the second seat section.

When the second seat section of the passenger seat according to the invention is in its second operational position, a passenger is comfortably able to stand in front of the passenger seat. When the passenger seat according to the invention is used in a means of transport, for example in a train, a bus or an aircraft, the passenger thus does not have to leave his row of seats and move into the aisle when, for example, it is necessary to allow a passenger seated on an adjacent passenger seat to reach his place or to leave his place. As a result, it is possible to shorten the boarding and disembarking cycles, the length of which has a major influence on the operating costs of an aircraft in particular in the operation of large commercial aircraft. In addition, simplified cleaning of the passenger cabin is possible when the second seat section of the passenger seat according to the invention is in its second operational position.

Attached to the second seat section of the passenger seat according to the invention is a holder, which is movable relative to the second surface of the second seat section between a first operational position and a second operational position. In its first operational position, the holder extends substantially parallel to the second surface of the second seat section. In its first operational position, the holder preferably rests against the second surface of the second seat section and thus has a small space requirement. In its second operational position, on the other hand, the holder extends at an angle of approximately from 60° to 120° relative to the second surface of the second seat section. If desired, the holder may also extend at an angle of from 70° to 110°, from 80° to 100° and particularly preferably at an angle of approximately 90° relative to the second surface of the second seat section when the holder is in its operational position. The holder may be connected to the second seat section by means of a hinge or the like, for example, so as to be pivotable between its first and second operational positions.

When the second seat section is in its second operational position, a piece of luggage can conveniently and easily be stowed beneath the seat of the passenger seat according to the invention. The holder can then be brought into its second operational position so that the holder rests against the piece of luggage stowed beneath the seat as soon as the second seat section is located in its first operational position. The holder thus reliably prevents the piece of luggage stowed beneath the seat from slipping. The passenger seat according to the invention accordingly allows pieces of luggage to be accommodated easily and in a space-saving manner and thus permits optimum use of the space in the passenger cabin of an aircraft or other means of transport.

When the second seat section is in its second operational position, the second surface of the second seat section extends relative to the second surface of the first seat section preferably at an angle of approximately from 70° to 110°, if required also at an angle of approximately from 80° to 100° and particularly preferably at an angle of approximately 90°. Such an arrangement of the second seat section allows a piece of luggage to be stowed particularly easily beneath the seat of the passenger seat according to the invention and at the same time enables the space requirement of the passenger seat with the second seat section arranged in its second operational position to be minimised. In addition, the second seat section can be used by a passenger to support himself even when it is in its second operational position.

Preferably, a seat cushion that at least partially covers the first surface of the second seat section also extends at least over a subregion of an end face of the seat section delimited by the first and second surfaces of the second seat section. As a result, a passenger is able to support himself comfortably on the second seat section when the second seat section is in its second operational position.

The second seat section of the passenger seat according to the invention is preferably biased into its second operational position. A suitable spring system or the like, for example, may be used for that purpose. Such a configuration of the passenger seat according to the invention facilitates access to rows of seats comprising a plurality of passenger seats. In addition, the holder attached to the second seat section is immediately visible to a passenger when the second seat section is in its second operational position. As a result, it can immediately be communicated to the passengers that pieces of luggage are stowed beneath the seat of the passenger seat and are to be fixed in position by means of the holder attached to the second seat section, If desired, the second seat section, for example in the region of its second surface, may also be provided with appropriate printing or with an appropriate sign which explains the use of the holder.

If desired, the biasing mechanism that biases the second seat section into its second operational position may also be coupled with a biasing mechanism that biases an armrest or armrests of the passenger seat into a raised position. Access to a row of seats comprising a plurality of passenger seats is thereby facilitated even further.

The holder, on the other hand, is preferably biased into its first operational position in which it extends substantially parallel to the second surface of the second seat section and preferably rests against the second surface of the second seat section. As a result, it is ensured that the holder has a small space requirement when it is not required. Access to a row of seats comprising a plurality of passenger seats is accordingly not hindered by the holder attached to the second seat section.

Additionally or alternatively, the holder may comprise a locking mechanism which is configured to lock the holder in its second operational position. Such a locking mechanism prevents the holder from moving back in an undesirable manner into its first operational position, for example when only a small or light piece of luggage is stowed beneath the seat of the passenger seat and consequently does not apply sufficient pressure to the holder to hold the holder in its second operational position against the biasing force acting on the holder.

The holder may be provided with a non-slip surface at least in the region of a face that faces the second surface of the second seat section when the holder is in its first operational position and that is configured to cooperate with a piece of luggage stowed beneath the seat of the passenger seat when the holder is in its second operational position. Optimum cooperation of the holder with a piece of luggage stowed beneath the seat of the passenger seat is thereby made possible. The non-slip surface may be produced, for example, by a rubber coating which is applied to the holder and which, if desired, may also be provided with pimples or the like.

The holder may be telescopic. It is thereby possible to adjust the size of the holder to different sizes of pieces of luggage that are to be stowed beneath the seat of the passenger seat. Alternatively or in addition, it is conceivable to attach the holder in a displaceable manner to the second seat section. To that end, the holder may be mounted, for example, in a rail system or the like. As a result, the holder can always be positioned optimally in order to ensure that a piece of luggage stowed beneath the seat of the passenger seat is held securely.

The holder may be attached to the second surface of the second seat section. Alternatively, it is, however, also possible to connect the holder to the end face of the second seat section delimited by the first and second surfaces of the second seat section. When the holder is attached in that manner, however, the holder must be appropriately shaped in order to enable the holder to be brought without difficulty into its first operational position in which the holder extends substantially parallel to the second surface of the second seat section. In addition, it is also conceivable to attach the holder to the second seat section in the region of an edge which is defined by the second surface of the second seat section and the end face of the second seat section.

In a preferred embodiment, the passenger seat according to the invention is provided with a base tray. The base tray is preferably arranged beneath the seat of the passenger seat and serves to receive a piece of luggage placed beneath the seat of the passenger seat. If desired, the base tray may be provided with a non-slip surface of rubber or the like. If desired, pimples or the like may be provided on the non-slip surface of the base tray. Alternatively or in addition, the base tray may have in the region of an edge that is remote from the backrest of the passenger seat, that is to say a front edge, a projection that projects in the direction towards the seat. A piece of luggage placed in the base tray is thereby additionally secured in its position beneath the seat of the passenger seat. Furthermore, the base tray may also have a projection that projects in the direction towards the seat in the region of an edge that faces the backrest of the passenger seat, that is to say in the region of a rear edge.

The base tray may be associated with only one seat. Alternatively, however, a configuration of the base tray in which the base tray extends over an entire row of passenger seats is also conceivable. If desired, flexible separating elements may then also be present in the region of the base tray, which separating elements serve to clearly assign the individual base tray sections to corresponding passenger seats.

The passenger seat according to the invention is suitable in particular for use in a means of transport, such as, for example, a train, a bus or an aircraft.

BRIEF DESCRIPTION OF DRAWINGS

Preferred embodiments of the invention will now be explained in greater detail by means of the accompanying schematic drawings, in which.

DETAILED DESCRIPTION OF EMBODIMENTS

Figure 1:
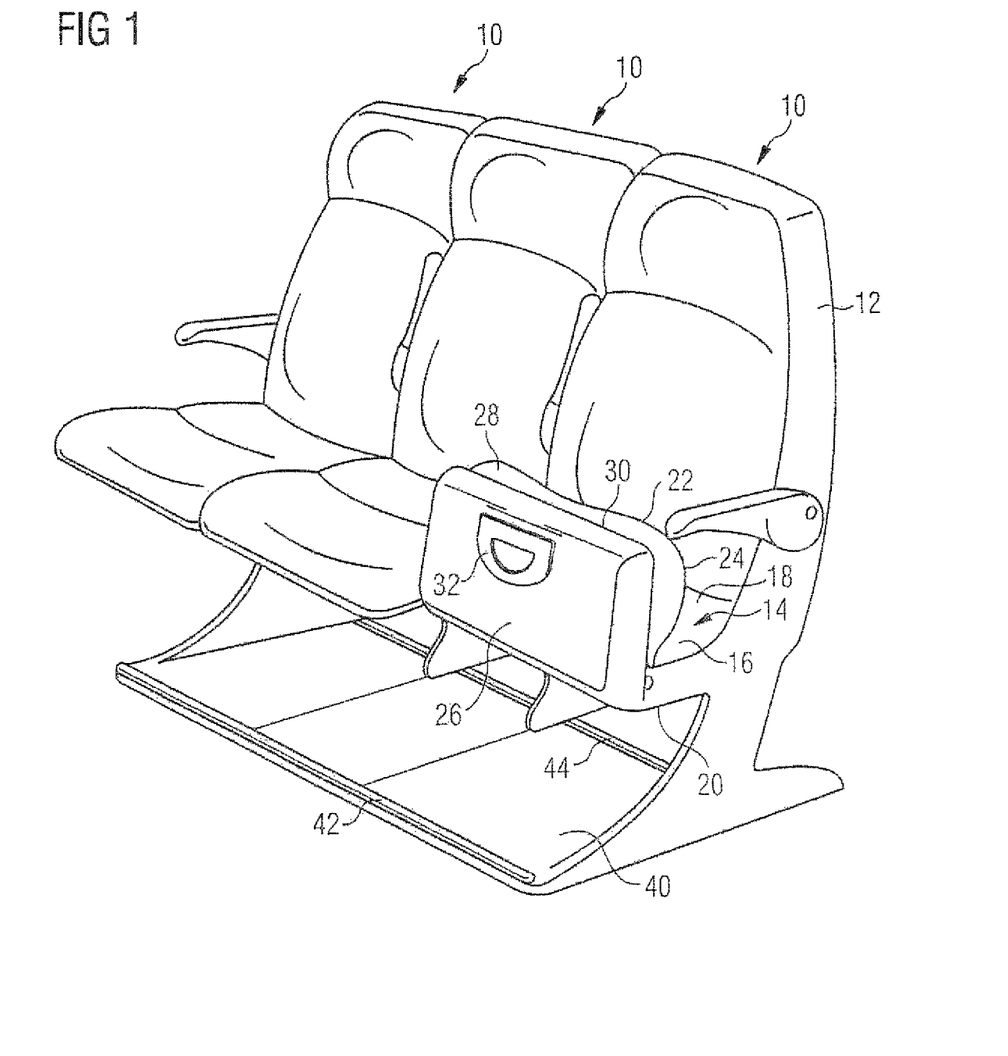
FIG. 1 shows three passenger seats arranged in a row.

A passenger seat 10 which is suitable for use in a means of transport, in particular an aircraft, and which in the view according to FIG. 1 is arranged in a row of seats comprising three passenger seats 10 comprises a backrest 12 and a seat 14. The backrest 12 is pivotable relative to the seat 14 between an upright position and a reclined position. The seat 14 comprises a first section 16 having a first surface 18 and a second surface 20 opposite the first surface 18. The seat 14 further comprises a second section 22 having a first surface 24 and a second surface 26 opposite the first surface 24. The second seat section 22 is pivotable relative to the first seat section 16 between a first and a second operational position.

Figure 2:
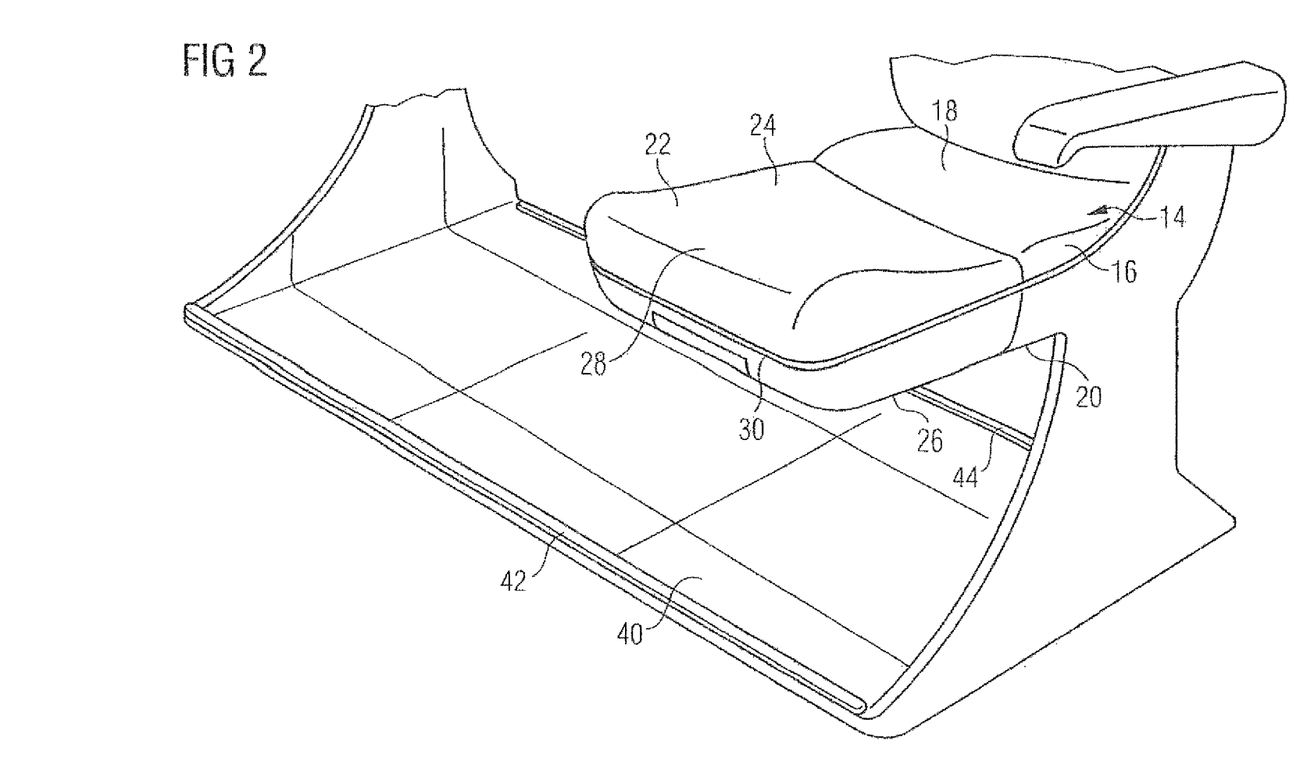
FIG. 2 shows a detailed view of a passenger seat of the row according to FIG. 1, in which a second section of a seat of the passenger seat is in its first operational position.
Figure 3:
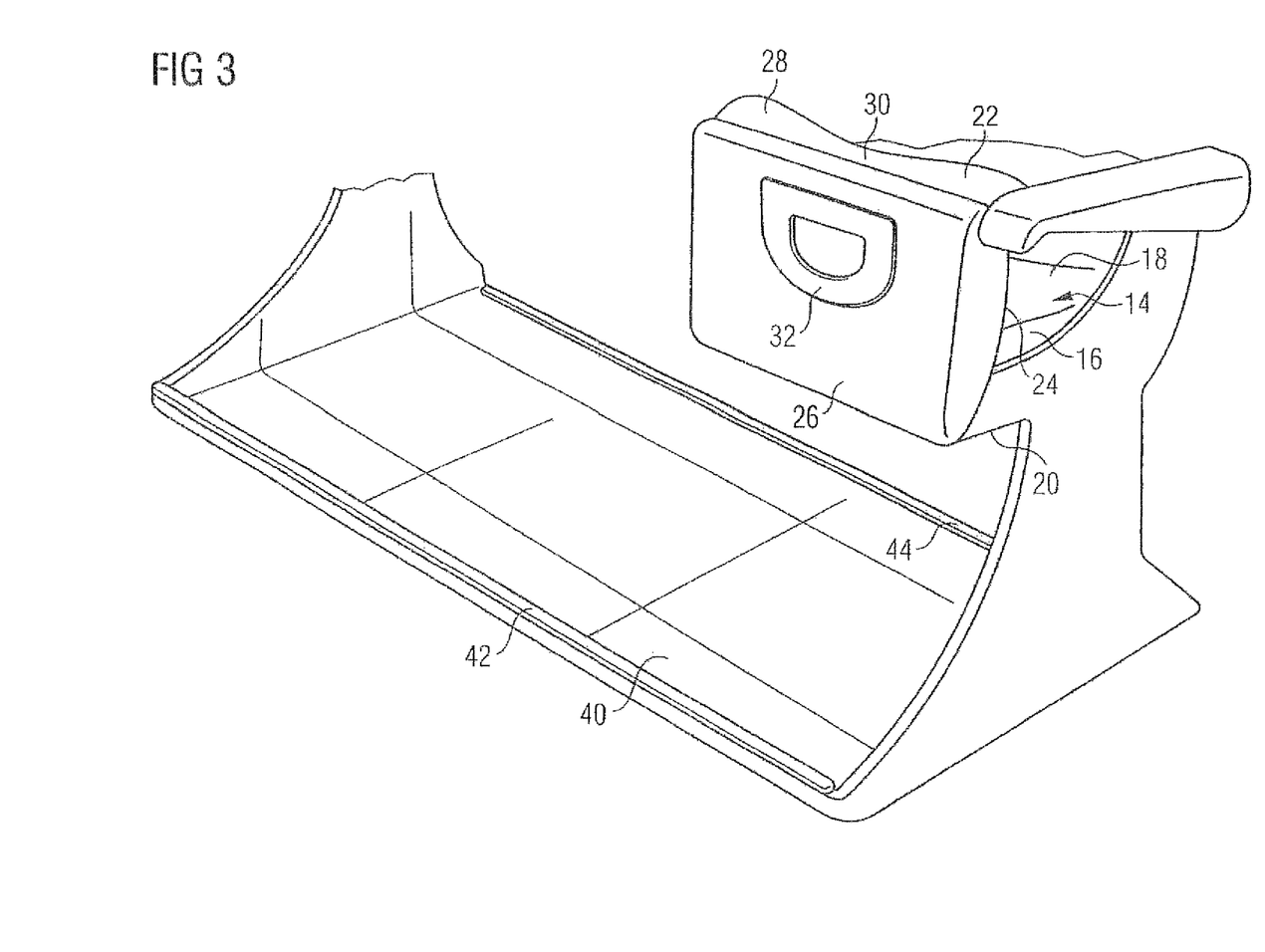
FIG. 3 shows a view according to FIG. 2, in which the second section of the seat of the passenger seat, however, is now in its second operational position.

When the second seat section 22, as shown in FIG. 2, is in its first operational position, the first seat section 16 and the second seat section 22 are positioned behind one another relative to the backrest 12, that is to say the second seat section 22 is separated from the backrest 12 by the first seat section 16. The first surface 18 of the first sub-section 16 and the first surface 24 of the second sub-section 22 thus form a usable total seat area on which a passenger can sit. When, on the other hand, the second seat section 22 is in its second operational position, as shown in FIG. 3, the second seat section 22 is folded relative to the first seat section 16 in the direction towards the backrest 12, the second surface 26 of the second seat section 22 extending at an angle of approximately 90° relative to the second surface 20 of the first seat section 16.

Figure 5:
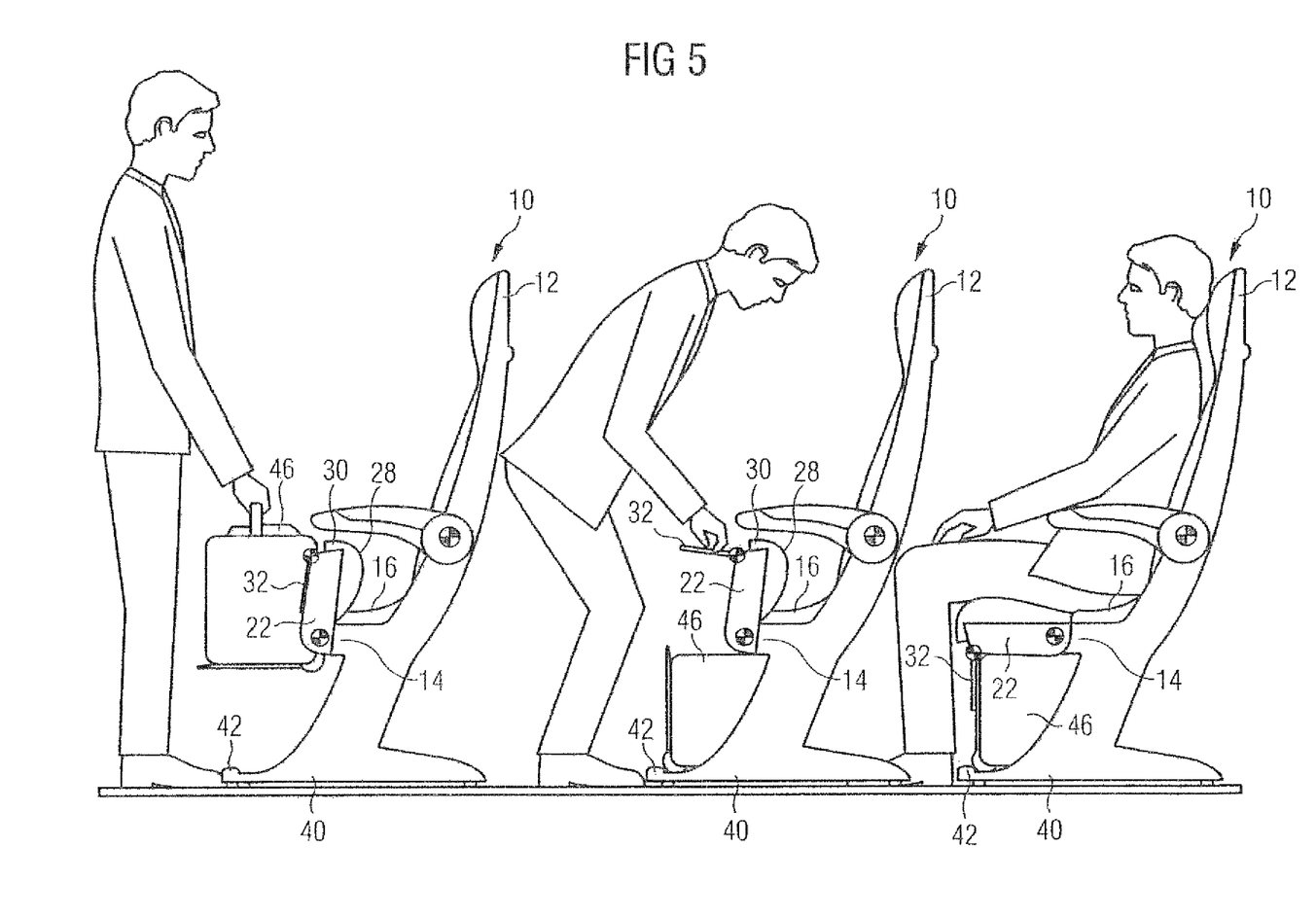
FIG. 5 illustrates the use of the passenger seat according to FIGS. 1 to 3.

As can best be seen in the view according to FIG. 5, a seat cushion 28 that covers the first surface 24 of the second seat section 22 also extends over part of an end face 30 of the second seat section 22 delimited by the first and second surfaces 24, 26 of the second seat section 22. As a result, a passenger is comfortably able to support himself on the second seat section 22 when the second seat section 22 is in its second operational position.

Figure 4:
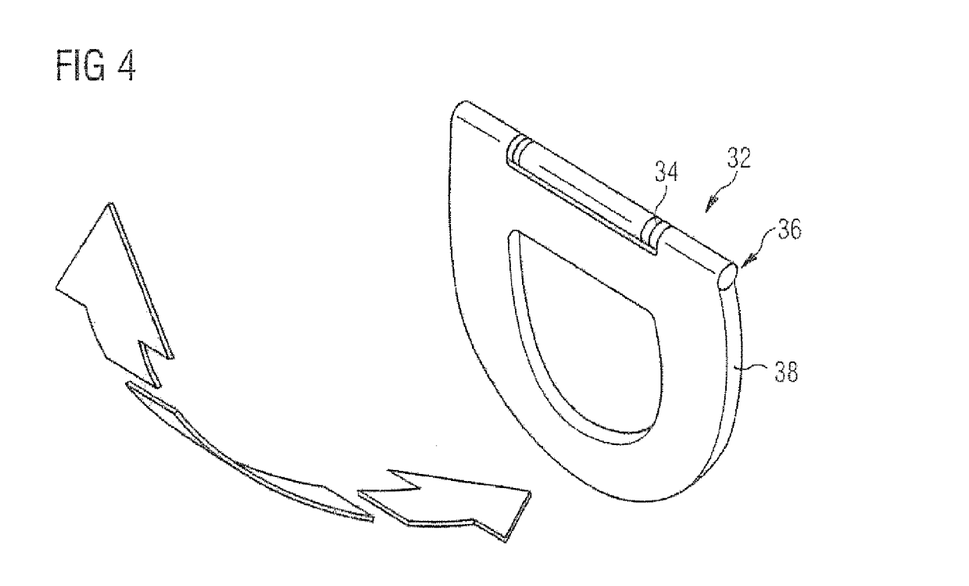
FIG. 4 shows a detailed view of a holder attached to the second seat section.

Attached to the second seat section 22 is a holder 32. The holder 32, which is shown in detail in FIG. 4, is pivotable relative to the second surface 26 of the second seat section 22 between a first and a second operational position, In its first operational position, the holder 32 extends substantially parallel to the second surface 26 of the second seat section 22, that is to say the holder 32 rests against the second surface 26 of the second seat section 22 or alternatively is integrated therein. When, on the other hand, the holder 32 is in its second operational position, the holder extends at an angle of approximately 90° relative to the second surface 26 of the second seat section 22. The holder is biased into its first operational position by a spring mechanism 34, which is shown only schematically in FIG. 4, but can be locked in its second operational position by a locking mechanism 36, which is likewise shown only schematically in FIG. 4.

In the region of a face 38 that faces the second surface 26 of the second seat section, that is to say that rests against the second surface 26 of the second seat section 22 when the holder 32 is in its first operational position, the holder 32 is provided with a non-slip surface. The non-slip surface may be formed, for example, by a rubber coating applied to the face 38 of the holder 32. In the embodiments of the passenger seat 10 that are shown in the figures, the holder 32 is attached to the second seat section 22 in such a manner that it is only pivotable between its first operational position and its second operational position. Alternatively, however, the holder 32 can be telescopic and/or attached in a displaceable manner to the second seat section 22.

Finally, a base tray 40 which extends along a complete row of passenger seats 10 beneath the seats 14 of the passenger seats 10 is provided. The base tray 40 is provided with a non-slip surface, for example in the form of a rubber coating, and has in the region of a front edge that is remote from the backrest 12 of the passenger seat 10 a projection 42 that projects in the direction towards the seat 14. The base tray 40 is also provided with a projection 44 that projects in the direction towards the seat 14 in the region of a rear edge that faces the backrest 12 of the passenger seat 10.

The use of the passenger seat 10 is explained hereinbelow with particular reference to FIG. 5. As already mentioned, the second seat section 22 of the passenger seat 10 is spring-biased into its second operational position. As a result, a passenger can comfortably approach the passenger seat 10 even when the passenger seat 10 is positioned in a row of seats that is arranged at only a small distance behind a further row of seats. In addition, the holder 32 attached to the second seat section 22 is clearly visible to the passenger.

As long as the second seat section 22 is in its second operational position, the passenger can comfortably position a piece of luggage 46 beneath the seat 14 of the passenger seat 10 in the base tray 40. Because the base tray 40 has a non-slip surface, the piece of luggage 46 in the base tray 40 is prevented from slipping. In addition, the projections 42, 44 provided on the base tray 40 also prevent the piece of luggage from slipping, the projections 42, 44 being of such a size, however, that they do not constitute a "tripping hazard".

In order finally to secure the piece of luggage 46 in its position beneath the seat 14 of the passenger seat 10, the passenger then folds the holder 32 attached to the second seat section 22 into its second operational position. Operation of the holder 32 can comfortably take place in the second operational position of the second seat section 22. In the last step, the passenger finally folds the second seat section 22 into its first operational position and sits on the seat. The second seat section 22 is thus held in its first operational position. The rubberised face 38 of the holder 32 then rests against the piece of luggage 46 and prevents the piece of luggage 46 from slipping out of its position beneath the seat 14 of the passenger seat 10.

Figure 6:
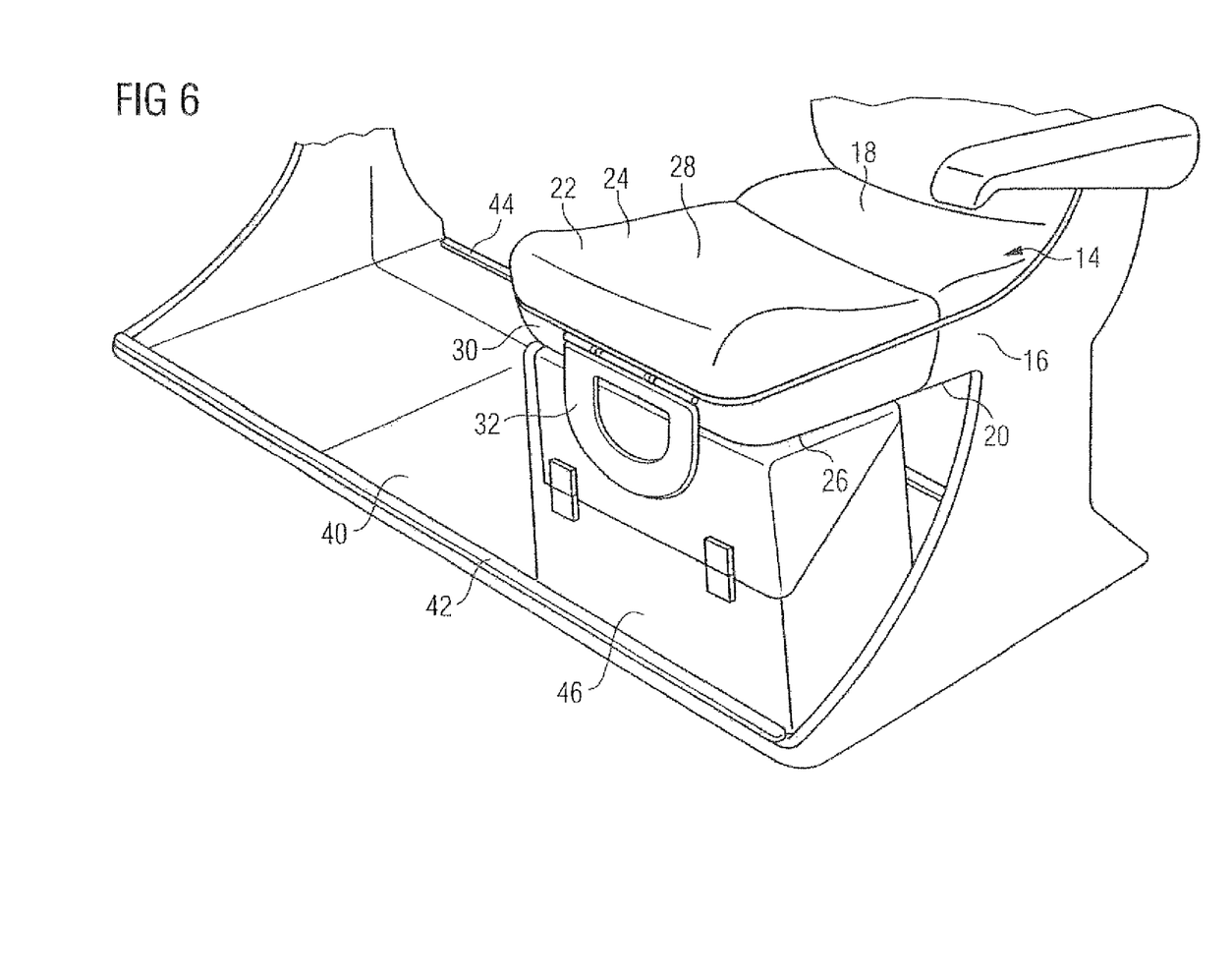
FIG. 6 shows an alternative embodiment of a passenger seat.

The embodiment of a passenger seat 10 shown in FIG. 6 differs from the arrangement according to FIGS. 1 to 5 in that the holder 32 is not attached to the second surface 26 of the second seat section 22 but is pivotably attached to the second seat section 22 in the region of the end face 30 of the second seat section 22. Otherwise, the construction and mode of operation of the passenger seat shown in FIG. 6 correspond to the construction and mode of operation of the passenger seat 10 according to FIGS. 1 to 5.

The invention claimed is:

1. A passenger seat having:
a backrest and
a seat which comprises a first section and a second section, wherein the first and second seat sections each have a first surface provided for use as a seat area and a second surface opposite the first surface, and wherein the second seat section is pivotable relative to the first seat section between a first operational position, in which the first surfaces of the first and second seat sections form a usable total seat area, and a second operational position, in which the second seat section is folded relative to the first seat section in the direction towards the backrest, wherein:
there is attached to the second seat section a holder which is movable relative to the second surface of the second seat section between a first operational position, in which the holder extends substantially parallel to the second surface of the second seat section, and a second operational position, in which the holder extends at an angle in a range of from 60° to 120° relative to the second surface of the second seat section,
the holder is biased by a bias force towards its first operational position and is movable by a user against said bias force to its second operational position,
the holder is positionable in a space-saving manner in its first operational position substantially parallel to the second surface of the second seat section independent of whether the second seat section is located in its first operational position or its second operational position,
when the holder is not required for securing a stowed piece of luggage, the holder is located in its first operational position parallel to the second surface of the second seat section in a space-saving manner independent of whether the second seat section is located in its first operational position or its second operational position, and
when a piece of luggage is stowed beneath the seat and the second seat section is in its first operational position, the holder is located in its second operational position to secure the piece of luggage from slipping out of position beneath the seat.

2. The passenger seat according to claim 1,
wherein the second surface of the second seat section is configured to extend relative to the second surface of the first seat section at an angle in a range of from 70° to 110°, when the second seat section is in its second operational position.

3. The passenger seat according to claim 1,
wherein a seat cushion that at least partially covers the first surface of the second seat section extends at least over a sub-region of an end face of the second seat section delimited by the first and second surfaces of the second seat section.

4. The passenger seat according to claim 1,
wherein the second seat section is biased into its second operational position.

5. The passenger seat according to claim 1,
wherein the holder comprises a locking mechanism which is configured to lock the holder in its second operational position.

6. The passenger seat according to claim 1,
wherein the holder is provided with a non-slip surface at least in the region of a face that faces the second surface of the second seat section when the holder is in its first operational position.

7. The passenger seat according to claim 1,
wherein the holder is telescopic.

8. The passenger seat according to claim 1,
wherein the holder is attached to the second seat section in a displaceable manner.

9. The passenger seat according to claim 1,
wherein the holder is attached to the second surface of the second seat section or to the end face of the second seat section delimited by the first and second surfaces of the second seat section.

10. The passenger seat according to claim 1,
further comprising a base tray which is provided with a non-slip surface.

11. The passenger seat according to claim 1,
further comprising a base tray which has in the region of an edge that is remote from the backrest of the passenger seat a projection that projects in the direction towards the seat.

12. The passenger seat according to claim 1,
further comprising a base tray which has in the region of an edge that faces the backrest of the passenger seat a projection that projects in the direction towards the seat.

13. An aircraft comprising a passenger seat according to claim 1.

14. The passenger seat according to claim 1, wherein the second surface of the second seat section is configured to extend relative to the second surface of the first seat section at an angle in a range of from 80° to 100°.

15. The passenger seat according to claim 1, wherein the second surface of the second seat section is configured to extend relative to the second surface of the first seat section at an angle of approximately 90°.

* * * * *